(12) United States Patent
Yasuda et al.

(10) Patent No.: US 6,571,627 B2
(45) Date of Patent: Jun. 3, 2003

(54) SLIDE DETECTOR

(75) Inventors: Atsushi Yasuda, Kariya (JP); Shinji Tsuda, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/977,680

(22) Filed: Oct. 16, 2001

(65) Prior Publication Data
US 2002/0046601 A1 Apr. 25, 2002

(30) Foreign Application Priority Data

Oct. 24, 2000 (JP) ........................................ 2000-324181
May 11, 2001 (JP) ........................................ 2001-142212

(51) Int. Cl.[7] ........................ G01F 23/32; G01F 23/56; G01F 23/00
(52) U.S. Cl. .................. 73/317; 73/305; 73/290 R; 73/313; 73/319
(58) Field of Search ................ 73/290 R, 305, 73/317

(56) References Cited

U.S. PATENT DOCUMENTS 6,389,892 B1 * 5/2002 Sato et al. ................ 73/304 R

FOREIGN PATENT DOCUMENTS

| DE | 299 17 759 U1 | 2/2000 |
|---|---|---|
| JP | A-54-157663 | 12/1997 |

* cited by examiner

*Primary Examiner*—Helen Kwok
*Assistant Examiner*—Rodney Frank
(74) *Attorney, Agent, or Firm*—Posz & Bethards, PLC

(57) ABSTRACT

In a slide detector, a contact member provided on a slider is made of gold or a gold alloy including an abrasion resistant metallic component, and a plurality of electrodes provided on an electric insulating board is made of a silver alloy including glass. Preferably, the contact member sliding on the electrodes is made of a gold alloy consisting of 99% by weight of gold and 1% by weight of cobalt, so that an anti-sulfurization and an abrasion resistance between the contact member and the electrodes is ensured. However, the weight percent of gold and other alloys may vary depending upon the abrasion characteristics desired.

12 Claims, 3 Drawing Sheets

SLIDE DETECTOR

CROSS REFERENCE TO RELATED APPLICATION

The present application relates to and incorporates herein by reference Japanese Applications No. 2000-324181 filed on Oct. 24, 2000 and No. 2001-142212 filed on May 11, 2001.

BACKGROUND OF THE INVENTION

1. Field of the Invention

The present invention relates to a slide detector.

2. Description of Related Art

Generally, in a conventional slide detector, a contact portion of a slider moves on or across electrodes of a conductor layer provided on a board. However, the contact portion of the slider or the electrodes are made of a silver palladium alloy or a silver nickel alloy. When a liquid fuel from a fuel tank of a vehicle is detected by the slide detector, the silver palladium alloy and the silver nickel alloys react to sulfide in the fuel if sulfide or sulfide impurities are contained in the fuel. Accordingly, the contact portion or the electrodes pick up sulfides and become sulfurized. As a result, a coating is formed between the contact portion and the electrodes thereby causing electrical contact failures and, at worst, entirely preventing the contact and the electrodes from electrically communicating.

SUMMARY OF THE INVENTION

In view of the foregoing problems, it is an object of the present invention to provide a slide detector having a slider and a plurality of electrodes in which an electrical contact between a contact member of the slider and the electrodes is satisfactorily maintained by suppressing sulfurization of the contacting members. That is, by preventing sulfur from lodging on the slider contact and the electrode(s), a satisfactory electrical contact is maintained. Further, it is another object of the present invention to provide a slide detector having a slider and an electrode(s), in which either the electrode(s) or the slider contact is made of a gold alloy containing an abrasion resistant metallic component in order to ensure anti-sulfurization and abrasion resistance of the electrode(s) and the contact portion.

According to one aspect of the present invention, in a slide detector, a slider has a contact member that slides on a plurality of electrodes arranged side by side from a resistive layer on a board. The plurality of electrodes are made of a silver alloy including glass, and the contact is made of gold or a gold alloy containing an abrasion resistant metallic component. Thus, when the contact member slides on the electrodes, surfaces of the electrodes on which the contact member slides are coated and become gold plated due to the gold component of the contact member. Accordingly, anti-sulfurization is obtained and electrical contact between the contact member and the electrodes are satisfactorily maintained. The gold alloy contains an amount of gold by weight percent equal to or more than 98% but equal to or less than 99.5% (98%≦wt.% of gold≦99.5%).

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

One embodiment of the present invention will be described with reference to the accompanying drawings.

Figure 1:
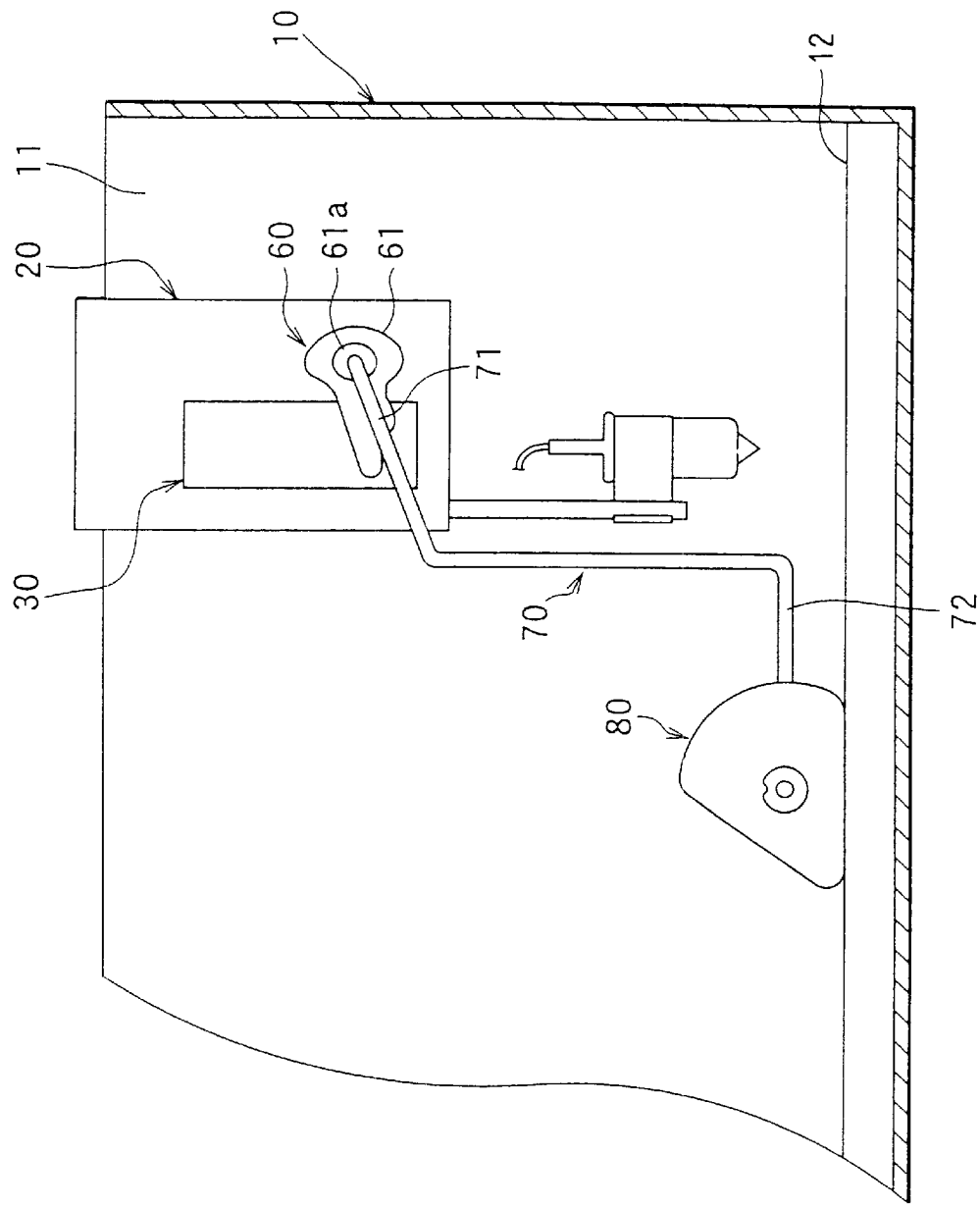
FIG. 1 is a partial cross-sectional view of a slide detector disposed in a fuel tank of a vehicle, according to an embodiment of the present invention.
Figure 2:
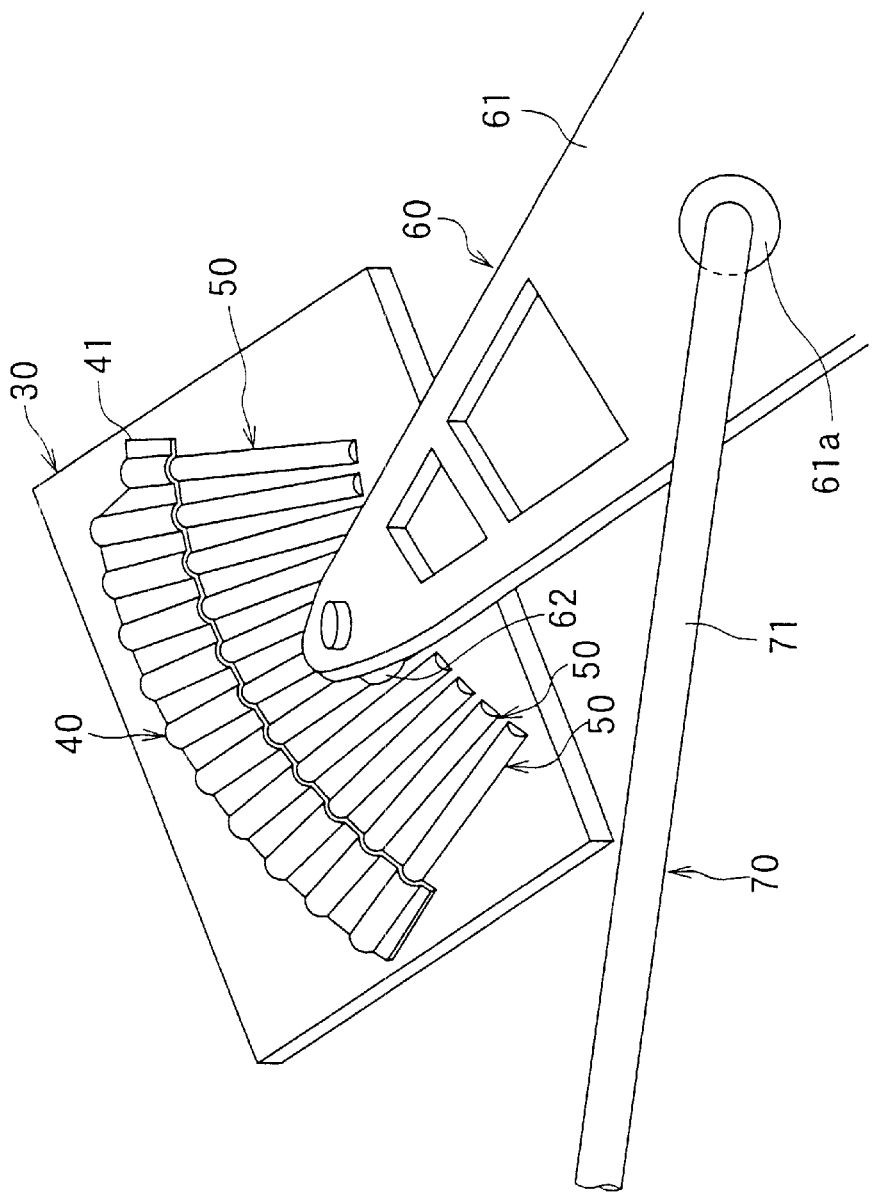
FIG. 2 is an enlarged partial perspective view showing a board, a resistive layer, electrodes, a slider and an arm of the slide detector according to an embodiment of the present invention.

FIG. 1 shows a slide detector used for detecting a fuel 12 amount level in a fuel tank 10 of a vehicle. In gasoline, a sulfide component is included. The slide detector is supported at an inner surface of a fuel tank 10 near an opening 11 by a support plate 20. As shown in FIG. 2, the slide detector has an electrical insulating board 30 and a slider 60 on the support plate 20. On the electrical insulating board 30, a plurality of electrodes 50 is arranged side by side and a resistive layer 40 is provided which covers a portion of one end of the electrodes 50. The electrodes 50 are made of a silver palladium alloy.

The slider 60 is composed of a conductive contact plate 61 and a cylindrical contact member 62. The contact plate 61 is long sideways (in a horizontal direction) and supported to be rotatable in an up-down (vertical) direction of FIG. 1, centered on a rotation base 61a. The rotation base 61a is provided on the support plate 20 proximate to the electrical insulating board 30. The contact member 62 is fixed at a tip of the contact plate 61 so as to slide on the plurality of electrodes 50.

In one embodiment, the cylindrical contact member 62 is made of a gold alloy including cobalt. This alloy consists of 99% by weight of gold and 1% by weight of cobalt. Since gold minimally reacts to sulfide included in gasoline, as compared with a silver palladium alloy or a silver nickel alloy, gold is used as an anti-sulfur reacting metallic component. However, since gold is soft, cobalt is used as an abrasion resistant metallic component in order to provide hardness. A compounding ratio of gold and cobalt is determined in order to ensure the anti-sulfurization and the abrasion resistance of the contact member 62. Here, the contact plate 61 functions as a negative terminal and a right hand side end 41 of the resistive layer 40 (FIG. 2) functions as a positive terminal of the slide detector.

As shown in FIG. 1, the slide detector has a rod like electrical insulating arm 70 and a float 80. An inner arm 71 of the electrical insulating arm 70 is integrally connected to the rotation base 61a so that the electrical insulating arm 70 is movable in accordance with the rotation of the contact plate 61 centered on the rotation base 61a along a surface of the support plate 20.

The other end of the electrical insulating arm 70 is an outer arm 72, and the float 80 is connected at an end of the outer arm 72 to be rotatable relative to the outer arm 72. The float 80 floats on a surface of the gasoline (liquid fuel 12) so that the float 80 displaces in accordance with a displacement of a surface of the gasoline (corresponding to a rest position, that is, a steady-state position of the gasoline in the fuel tank). With the displacement of the float 80, the electrical insulating arm 70 rotates along the surface of the support plate 20 centered on the rotation base 61a of the contact plate 61. Thus, the contact plate 61 rotates with the rotation of the electrical insulating arm 70 so that the contact member 62 slides on the electrodes 50. Thus, a resistance between the right hand side end 41 of the resistive layer 40 and the electrodes 50, on which the contact member 62 slides, is detected and hence the amount of the gasoline in the fuel tank 10 is detected.

In case the contact member 62 is made of the silver palladium alloy or the silver nickel alloy, when the gasoline adheres to the contact member 62, the sulfide component in the gasoline readily reacts with the contact member 62. Further, an insulating coating is formed between the contact member 62 and the electrodes 50 due to the sulfide. In one embodiment of the present invention, however, the contact member 62 is made of a gold alloy so that the chemical reaction to the sulfide component is suppressed. Therefore, the insulating coating caused by the sulfide component is prevented from forming so that the contact member 62 maintains an anti-sulfuric state, thereby maintaining electrical contact between the contact member 62 and the electrodes 50. Accordingly, the gasoline amount level is accurately detected. Further, since the gold alloy includes cobalt, it is hard and not abraded easily. Thus, the contact member 62 maintains abrasion resistance and lasts long.

Next, modifications of the above embodiment will be described. The electrodes 50 are made of a silver palladium alloy including glass which is an alloy of silver including glass and palladium. Further, the contact member 62 is made of gold instead of the gold alloy. Other structures are similar to the above embodiment. In this modified embodiment, similar to the above embodiment, the gasoline amount level (liquid fuel level 12) is detected based on the resistance between the right hand side end 41 of the resistive layer 40 and the electrodes 50 on which the contact member 62 slides.

When the contact member 62 slides on the electrodes 50, contact portions between the electrodes 50 and the contact member 62 are coated and become gold plated due to the gold contained in the contact member 62. This occurs because the gold adheres thinly on contact portions of the electrodes 50 due to the glass included in electrodes 50. Therefore, due to the gold content, an insulating coating from the sulfide in the gasoline is prevented from forming between the contact member 62 and the electrodes 50 thereby ensuring the anti-sulfurization of contact member 62 and electrodes 50. This ensures electrical contact between the contact member 62 and the electrodes 50. Other effects are similar to the above embodiment except the abrasion resistance by cobalt included in the contact member 62.

Further, the contact member 62 may be made of the gold alloy (gold cobalt alloy) in place of the gold. Since the gold alloy is harder than the gold, the contact member 62 ensures abrasion resistance in addition to the above effects. Also, the electrodes 50 may be made of a silver nickel alloy including glass or the like, in place of the silver palladium alloy including glass. The present invention will provide similar effects if the liquid fuel 12 is oil containing sulfide, as opposed to gasoline.

The amount of the gold contained in the gold alloy may be 99±0.1% by weight. Thus, the amount of the cobalt is arranged such that a total of the gold and cobalt is 100% by weight. Further, in the gold alloy described in the above embodiment and the modified embodiments, palladium nickel or other components having the abrasion resistance may be used in place of cobalt.

In order to ensure both the anti-sulfurization and the abrasion resistance, the gold included in the gold alloy may be 98% by weight or 99.5% by weight. In this case, the cobalt included was 2.0% by weight and 0.5% by weight, respectively. Preferably, the compounding ratio of gold and cobalt is formulated to obtain the anti-sulfurization and the abrasion resistance of the contact member 62. For example, when the gold in the gold alloy is equal to or more than 98% by weight and equal to or less than 99.5% by weight, both the anti-sulfurization and the abrasion resistance of the contact member 62 are ensured. Further, when the gold alloy contains 99% by weight of gold, both the anti-sulfurization and the abrasion resistance are satisfied.

In addition, the plurality of electrodes 50 may be made of a silver nickel alloy. Further, the present invention may be applied to detect liquid fuel 12 amounts (which include sulfide) of motor-cycles, busses and similar gasoline or fuel oil burning vehicles. Moreover, the present invention is not limited to a fuel meter, but may be applied to an instrument for detecting oil or the like which contains a sulfide component. The present invention may also be applied to a slide detector which has a variable resistive element, a plurality of electrodes connected thereto, and a slider in contact with the electrodes. Moreover, the plurality of electrodes 50 may be made of a gold alloy instead of making the contact 62 of the slider 60 from a gold alloy.

In order to show the most suitable percentage of gold to include in a gold alloy of the contact member 62 or electrodes 50, graphical relationships between an amount (in weight %) of gold and the abraded amount (in $\mu$m) of the contact member 62 and the electrodes 50 are provided. Experimental trials were conducted to show the relationships between the weight percent of gold and an abraded amount of the contact member, and between the weight percent of gold and the abraded amount of the electrodes, when the contact member 62 contacts the electrodes 50 from a position representing an empty fuel tank through to a position representing a full fuel tank for two million (2,000,000) cycles.

Figure 3A:
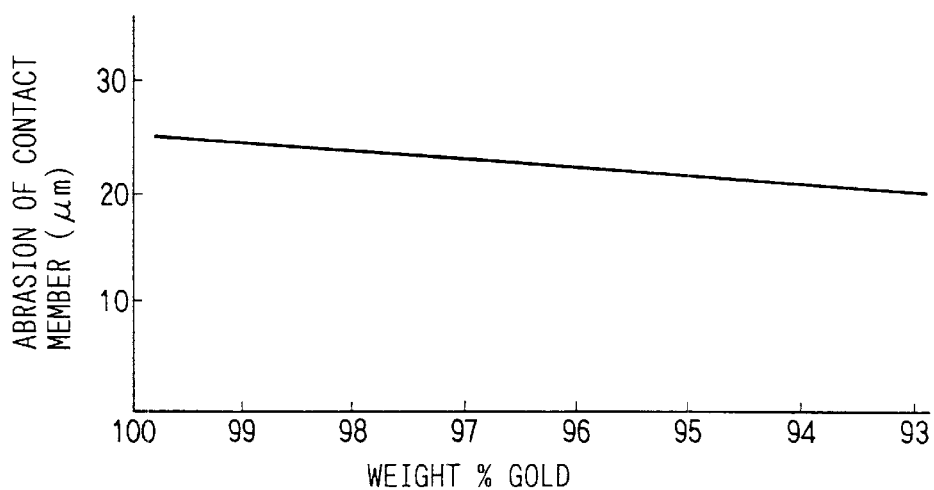
FIG. 3A is a graph showing the relationship between the gold content and an abrasion amount of a contact member.

In FIG. 3A, when the gold content of the contact member 62 approaches 100%, as shown on the left side of the horizontal axis, the contact member 62 becomes increasingly soft. Because the contact member 62 is softer than the electrodes 50 on which the contact member 62 slides, the abraded amount of the contact member 62 increases as the gold content increases.

Figure 3B:
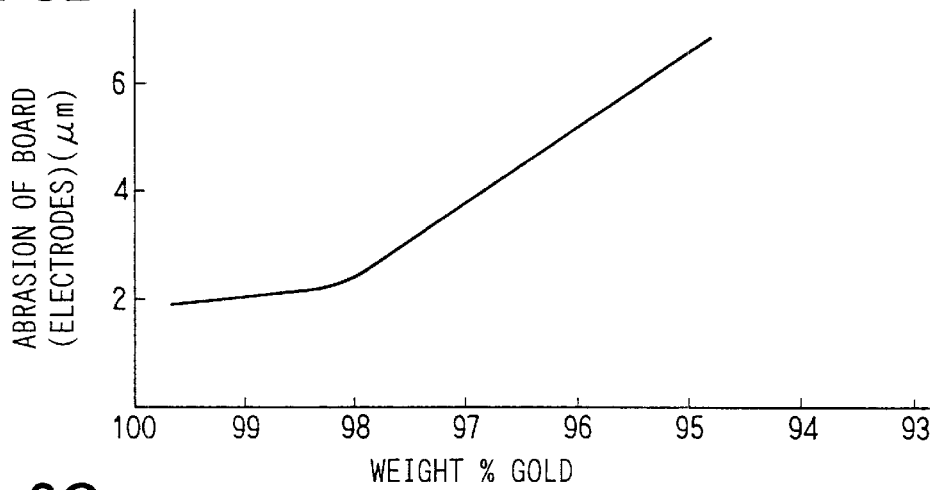
FIG. 3B is a graph showing the relationship between the gold content and an abrasion of a contact board or electrode (s)

With reference to FIG. 3B and its horizontal axis, as the gold content of the contact member 62 decreases, the abrasion of the electrodes 50 increases. This is due to the increasing hardness of the contact member 62 as the gold content decreases and the alloying component(s) increases. In particular, when the gold content becomes lower than 98%, a marked increase in electrode 50 abrasion (also measured in $\mu$m) results.

Figure 3C:
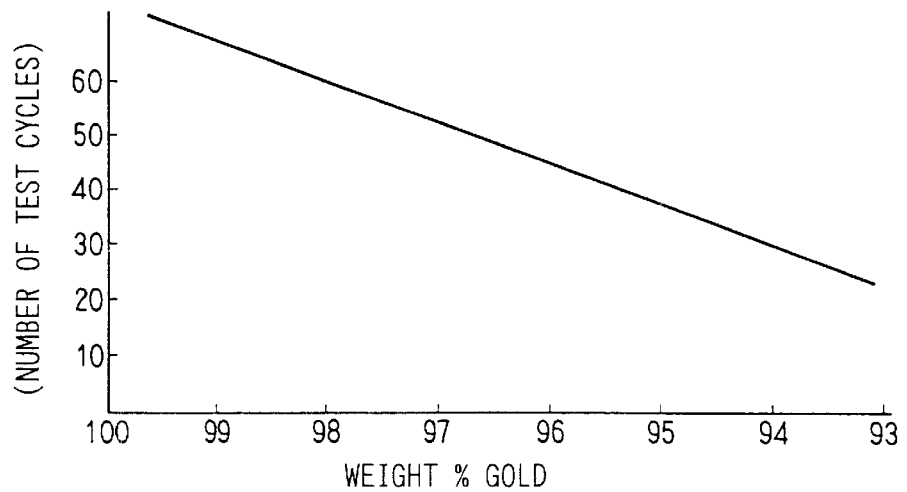
FIG. 3C is a graph showing the relationship between the gold content and the number of test cycles for a contact member or board (electrode(s)) of a slide detector.

FIG. 3C is a graphical representation showing the number of test cycles that caused problems when the fuel of a fuel tank contained a high sulfide amount (in parts per million (ppm)) versus the percentage of gold content (in weight percent) in either the contact member 62 or the electrode 50. The high sulfide concentration used to compile FIG. 3C was 10 parts per million (S: 10 ppm). Additionally, a test cycle consisted of vibrating the fuel tank for eight (8) hours and then allowing the fuel tank to rest in a non-vibratory state for sixteen (16) hours. As can be seen from FIG. 3C, as the gold ratio decreased, problems developed at a lower number of test cycles. The problems consisted of contact members 62 and electrodes 50 experiencing increased rates of abrasion and deteriorating states of electrical connectivity between the contact member 62 and the electrodes 50 caused by the concentration of sulfide in the gasoline of the tank and the weight percentage of gold used in the contact member 62 and the electrodes 50.

Additional advantages and modifications will readily occur to those skilled in the art. The invention in it broader terms is therefore, not limited to the specific details, representative apparatus, and illustrative examples shown and described.

What is claimed is:

1. A slide detector comprising:

a board;

a resistive layer provided on the board;

a plurality of electrodes arranged to extend from the resistive layer on the board; and a slider having a contact member which slides on the plurality of electrodes, the slider being disposed on the board or a stationary member near the board, wherein the plurality of electrodes are made of a silver alloy including glass, the contact member is made of a material containing gold and when the contact member slides on the electrodes, the material of the contact member adheres, as a film, to surfaces of the electrodes on which the contact member slides and which include the glass included in the electrodes.

2. A slide detector comprising:

a board disposed in a fuel tank of a vehicle which contains liquid fuel having a sulfide component;

a resistive layer provided on the board;

a plurality of electrodes arranged to extend from the resistive layer on the board;

a slider having a contact member which slides on the plurality of electrodes, the slider being disposed on the board or a stationary member near the board; and a float displaced in accordance with a displacement of a surface of the liquid fuel in the fuel tank, the float being connected to the slider, wherein the slider has the contact slide on the electrodes in accordance with the displacement of the float, and wherein the plurality of electrodes is made of a silver alloy including glass and the contact member is made of gold or a gold alloy, and when the contact member slides on the electrodes, the material of the contact member adheres, as a film, to surfaces of the electrodes on which the contact member slides and which include the glass.

3. The slide detector according to claim 1, wherein the silver alloy including glass further comprises an alloy of silver including glass and palladium.

4. The slide detector according to claim 1, wherein the gold alloy further comprises gold and an abrasion resistant metallic component, the gold content being not less than 98% by weight and not more than 99.5% by weight.

5. The slide detector according to claim 4, the abrasion resistant metallic component to be selected from the group consisting of cobalt, palladium, and nickel.

6. The slide detector according to claim 1, the gold alloy containing 98% by weight of gold.

7. The slide detector according to claim 1, the gold alloy containing 99% by weight of gold.

8. The slide detector according to claim 1, the gold alloy containing 99.5% by weight of gold.

9. A slide detector comprising:

a board;

a resistive layer provided on the board;

a plurality of electrodes arranged on the board to extend from the resistive layer; and a slider having a contact member which slides on the plurality of electrodes, the slider being disposed on the board or a stationary member near the board, wherein the plurality of electrodes is made of a silver alloy including glass, and the contact member is made of gold or a gold alloy including an abrasion resistant metallic component, and when the contact member slides on the electrodes, the material of the contact member adheres, as a film, to surfaces of the electrodes on which the contact member slides and which include the glass.

10. A slide detector comprising:

a board disposed in a fuel tank of a vehicle which contains liquid fuel having a sulfide component;

a resistive layer provided on the board;

a plurality of electrodes arranged to extend from the resistive layer on the board;

a slider having a contact member which slides on the plurality of electrodes, the slider being disposed on the board or a stationary member near the board; and a float displaced in accordance with a displacement of a surface of the liquid in the fuel tank, the float being connected to the slider, wherein the slider has the contact member slide on the electrodes in accordance with the displacement of the float, and wherein the plurality of electrodes is made of a silver alloy including glass, and the contact is made of gold or a gold alloy including an abrasion resistant metallic component, and when the contact member slides on the electrodes, the material of the contact member adheres, as a film, to surfaces of the electrodes on which the contact member slides and which include the glass.

11. The slide detector according to claim 10, wherein the silver alloy including glass further comprises palladium.

12. The slide detector according to claim 11, wherein the abrasion resistant metallic component is selected from the group consisting of cobalt, palladium, and nickel.

\* \* \* \* \*